United States Patent
Sharma et al.

(10) Patent No.: US 10,762,337 B2
(45) Date of Patent: Sep. 1, 2020

(54) FACE SYNTHESIS USING GENERATIVE ADVERSARIAL NETWORKS

(71) Applicant: Apple Inc., Cupertino, CA (US)

(72) Inventors: Vinay Sharma, Palo Alto, CA (US); Yaozong Gao, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 15/992,945

(22) Filed: May 30, 2018

(65) Prior Publication Data

US 2019/0332850 A1    Oct. 31, 2019

Related U.S. Application Data

(60) Provisional application No. 62/663,780, filed on Apr. 27, 2018.

(51) Int. Cl.
*G06K 9/00* (2006.01)
*G06K 9/62* (2006.01)
(Continued)

(52) U.S. Cl.
CPC ..... *G06K 9/00288* (2013.01); *G06K 9/00281* (2013.01); *G06K 9/00308* (2013.01);
(Continued)

(58) Field of Classification Search
CPC ............. G06K 9/00288; G06K 9/6268; G06K 9/00308; G06K 9/56; G06K 9/00281;
(Continued)

(56) References Cited

U.S. PATENT DOCUMENTS 6,671,391 B1 * 12/2003 Zhang ................ G06K 9/00228
382/118
10,198,624 B2 * 2/2019 Li ....................... G06K 9/00281
(Continued)

FOREIGN PATENT DOCUMENTS

CN         106951867 A       7/2017

OTHER PUBLICATIONS

Gauthier, Jon. "Conditional generative adversarial nets for convolutional face generation." (Year: 2015).*
(Continued)

*Primary Examiner* — Aaron W Carter
(74) *Attorney, Agent, or Firm* — Blank Rome LLP

(57) ABSTRACT

Training a generative adversarial network (GAN) for use in facial recognition, comprising providing an input image of a particular face into a facial recognition system to obtain a faceprint; obtaining, based on the input faceprint and a noise value, a set of output images from a GAN generator; obtaining feedback from a GAN discriminator, wherein obtaining feedback comprises inputting each output image into the GAN discriminator and determining a set of likelihood values indicative of whether each output image comprises a facial image; determining, based on each output image, a modified noise value; inputting each output image into a second facial recognition network to determine a set of modified faceprints; defining, based on each modified noise value and modified faceprint, feedback for the GAN generator, wherein the feedback comprises a first value and a second value; and modifying control parameters of the GAN generator.

20 Claims, 6 Drawing Sheets

(51) Int. Cl.
   *G06T 5/00* (2006.01)
   *G06K 9/56* (2006.01)
   *G06T 5/20* (2006.01)

(52) U.S. Cl.
   CPC ............. *G06K 9/56* (2013.01); *G06K 9/6268* (2013.01); *G06T 5/002* (2013.01); *G06T 5/20* (2013.01); *G06T 2207/20081* (2013.01); *G06T 2207/20084* (2013.01); *G06T 2207/30201* (2013.01)

(58) Field of Classification Search
   CPC .... G06K 9/6264; G06K 9/6271; G06T 5/002; G06T 5/20; G06T 2207/20084; G06T 2207/20081; G06T 2207/30201; G06T 11/00
   See application file for complete search history.

(56) References Cited

U.S. PATENT DOCUMENTS

| | | | | |
|---|---|---|---|---|
| 10,504,268 | B1* | 12/2019 | Huang | G06F 3/011 |
| 2014/0050372 | A1* | 2/2014 | Qi | G06K 9/00288 382/118 |
| 2018/0114056 | A1* | 4/2018 | Wang | G06K 9/00275 |
| 2018/0268202 | A1* | 9/2018 | Yu | G06K 9/00899 |
| 2018/0288086 | A1* | 10/2018 | Amiri | H04L 61/3025 |
| 2019/0050632 | A1* | 2/2019 | Weng | G06N 3/0454 |
| 2019/0080148 | A1* | 3/2019 | He | G06N 3/084 |
| 2019/0087648 | A1* | 3/2019 | Du | G06K 9/627 |
| 2019/0102528 | A1* | 4/2019 | Beacham | H04L 9/3231 |
| 2019/0122072 | A1* | 4/2019 | Cricr | G06K 9/6277 |
| 2019/0188830 | A1* | 6/2019 | Edwards | G06K 9/00771 |
| 2019/0197368 | A1* | 6/2019 | Madani | G06N 3/082 |
| 2019/0197670 | A1* | 6/2019 | Ferrer | G06K 9/00268 |
| 2019/0198156 | A1* | 6/2019 | Madani | G06N 3/0472 |
| 2019/0238568 | A1* | 8/2019 | Goswami | G06N 20/10 |
| 2019/0295302 | A1* | 9/2019 | Fu | G06N 3/0454 |
| 2019/0332850 | A1* | 10/2019 | Sharma | G06K 9/56 |
| 2019/0362191 | A1* | 11/2019 | Lin | G06F 16/5854 |
| 2019/0370529 | A1* | 12/2019 | Kumar | G06K 9/00275 |
| 2019/0370608 | A1* | 12/2019 | Lee | G06T 3/4053 |
| 2019/0392259 | A1* | 12/2019 | Kajimoto | G06K 9/6268 |
| 2020/0097767 | A1* | 3/2020 | Perry | G06K 9/00248 |

OTHER PUBLICATIONS

Goodfellow, Ian, "NIPS 2016 Tutorial: Generative Adversarial Networks," Apr. 3, 2017.
Wang, Xiaolong, and Abhinav Gupta, "Generative Image Modeling using Style and Structure Adversarial Networks," Jul. 26, 2016.

* cited by examiner

FACE SYNTHESIS USING GENERATIVE ADVERSARIAL NETWORKS

BACKGROUND

This disclosure relates generally to the field of digital image processing, and more specifically to the field of image synthesis using generative adversarial networks.

Facial identification systems require sample facial images from the user to be identified. Some facial identification systems use a large number of cameras with known properties placed at known positions under carefully controlled settings to generate the large number of sample facial images necessary for the enrollment process and training of the system. Such systems are unwieldy and unavailable to the average user, in addition to being expensive and delicate. While facial identification accuracy benefits from more numerous and diverse sample facial images during enrollment, providing such images greatly increases the burden on the user.

SUMMARY

In one embodiment, a method of training a generative adversarial network (GAN) for use in facial recognition is described. In another, a method of training a facial recognition network is described. A method for generating facial images using a GAN includes obtaining an input image of a particular face; inputting the input image into a facial recognition network; obtaining, from the facial recognition network, an input faceprint based on the input image; obtaining, based on the input faceprint and a noise value, a set of output images from a GAN generator; accessing a database of facial images; obtaining feedback from a GAN discriminator, wherein obtaining feedback from a GAN discriminator includes inputting each output image from the set of output images into the GAN discriminator; determining, for each output image and the database of facial images, a set of likelihood values indicative of whether each of the output images comprises a facial image; determining, based on each output image, a modified noise value; inputting each output image into a second facial recognition network; determining, based on each output image, a set of modified faceprints from the second facial recognition network; defining, based on each modified noise value and modified faceprint, feedback for the GAN generator, wherein the feedback comprises a first value and a second value; and modifying, based on the feedback, one or more control parameters of the GAN generator.

The method of training a facial recognition network includes obtaining an input image of a particular face; inputting the input image of the particular face into a first facial recognition network; obtaining, from the first facial recognition network, an input faceprint; obtaining, based on the input faceprint and a noise value, a set of output images from a pre-trained GAN generator functionally decoupled from the GAN discriminator, wherein the pre-trained GAN generator generates output images recognizable as images of the particular face; and training, based on the set of output images, a second facial recognition network to recognize the particular face.

In other embodiments, the methods described herein may be embodied in computer executable program code and stored in a non-transitory storage device. In still more embodiments, the methods may be implemented in an electronic device having image capture capabilities.

DETAILED DESCRIPTION

Figure 1:
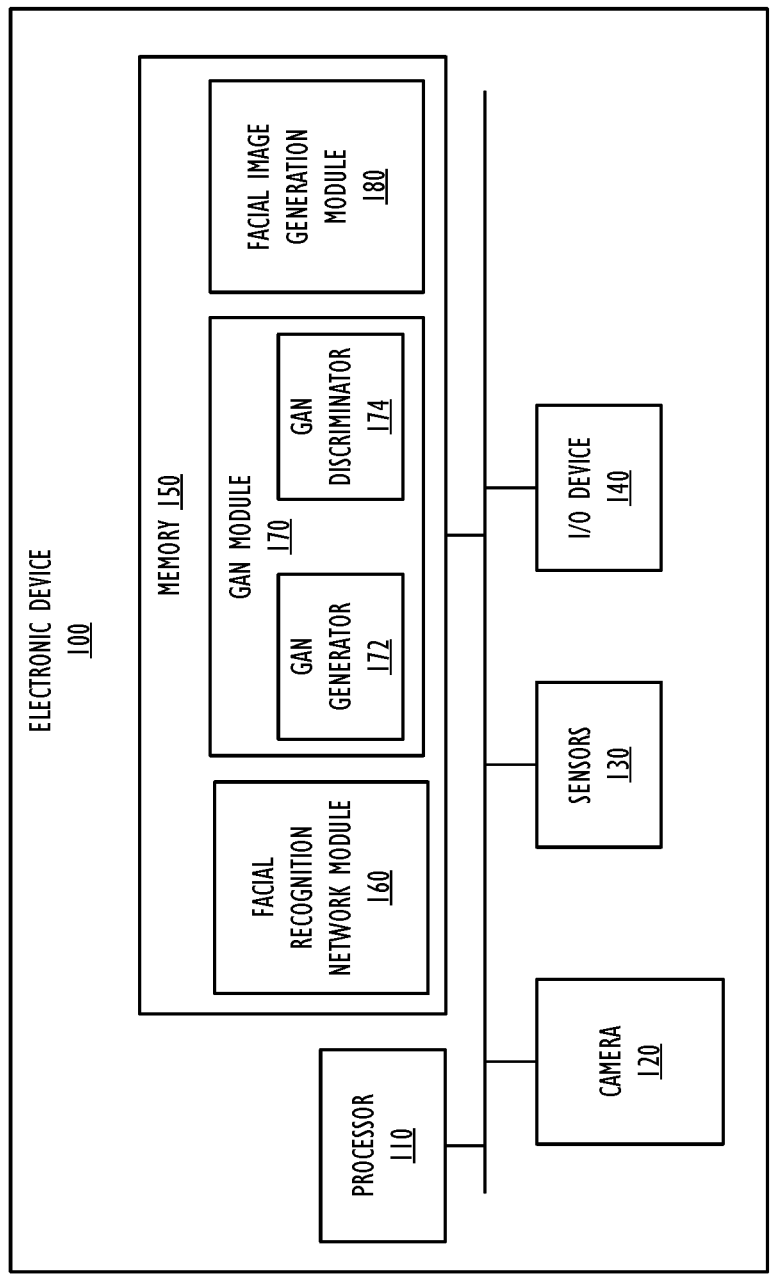
FIG. 1 shows, in block diagram form, a simplified electronic device according to one or more embodiments.

This disclosure is directed to systems, methods, and computer readable media for training a generative adversarial network (GAN) for use in facial recognition and training a facial recognition network. In general, an image of a particular face is input into a facial recognition network to obtain a faceprint. The faceprint in turn is input to a GAN generator along with a noise value to generate a set of output images. The output images are then input into a GAN discriminator which uses a database of images to determine a likelihood value indicative that each output image includes a face. Feedback is then sent from the discriminator to the generator and from the generator to the discriminator to represent adversarial losses between the two and modify the operation of the generator and discriminator to account for these adversarial losses. Traditional GANs cannot maintain the identity of the particular face in the output image.

In the disclosed embodiments, however, by modifying the feedback between the generator and discriminator, the identity of the particular face may be maintained from the input image to the output image. To preserve identity, the discriminator determines a modified noise value as well as the likelihood value indicative that the output image includes a face and the output image is input to the facial recognition system to obtain a modified faceprint. The modified noise value and modified faceprint are compared to the noise value and faceprint to determine a diversity loss and an identity loss. The diversity loss and identity loss are sent to the generator along with the adversarial loss to prompt modification of the generator's control parameters to preserve identity in generating the output image. Preserving identity from input image to output image allows creation of positive galleries of generated images with the same specific identity as the input image and negative galleries of generated images with different identities as the input image. These positive and negative galleries can be used to train a facial recognition network to identify the specific identity from a single input image. In this way, the burden on users during facial identification enrollment is lessened.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 510) refer to all instances of the drawing element with identifiers (e.g., 510A, 5108 and 510C). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera" refers to a lens assembly along with the sensor element and other circuitry utilized to capture an image. In one or more embodiments, the lens assembly may include multiple lenses. Further in one or more embodiments, the lens may be moved to various positions to capture images at multiple depths and, as a result, multiple points of focus. In one or more embodiments, the lens may refer to any kind of lens, such as a telescopic lens or a wide angle lens. As such, the lens assembly can mean a single optical element or multiple elements configured into a stack or other arrangement.

FIG. 1 shows, in block diagram form, a simplified electronic device for performing operations in accordance with this disclosure. Electronic device 100 may be part of a multifunctional device, such as a mobile phone, tablet computer, personal digital assistant, portable music/video player, wearable device, or any other electronic device that includes a camera system (either internal to electronic device 100 or externally connected to electronic device 100 as an independent system). Electronic device 100 may be connected to other electronic devices across a network, such as mobile devices, tablet devices, desktop devices, as well as network storage devices such as servers and the like. Electronic device 100 may also be connected to other electronic devices via a wireless or a wired connection. Electronic device 100 may include a processor 110. Processor 110 may be a system-on-chip such as those found in mobile devices and include one or more central processing units (CPUs), dedicated graphics processing units (GPUs), or both. Further, processor 110 may include multiple processors of the same or different type. Electronic device 100 may also include a memory 150. Memory 150 may include one or more different types of memory, which may be used for performing device functions in conjunction with processor 110. For example, memory 150 may comprise any type of non-transitory storage device, such as cache, read only memory (ROM), random access memory (RAM), solid state storage device, etc. Memory 150 may store various programming modules during execution, including a facial recognition network module 160, GAN module 170, and facial image generation module 180. Note, however, that facial recognition network module 160, GAN module 170, and facial image generation module 180 may be stored in memory other than memory 150, including in memory on other electronic devices. Facial recognition network module 160, GAN module 170, and facial image generation module 180 may comprise separate executable programming modules in some embodiments, but the functionality of the programming module can be combined into a single programming module.

Electronic device 100 may also include one or more cameras, such as camera 120. Camera 120 may include an image sensor, a lens stack, and other components that may be used to capture images. For example, camera 120 may be configured to capture images of a particular face. In addition, camera 120 may include multiple cameras, configured to capture images from different points of view. Electronic device 100 may also include additional sensors 130, such as, for example, proximity, ambient light, accelerometer and gyroscope sensors. In one or more embodiments, electronic device 100 may also include input/output (I/O) device 140. I/O device 140 may be any kind of I/O device, such as microphones for voice control input, speakers for audio data output, cameras for visual data input, displays for visual data output, touch screens for tactile input, or any combination thereof. For example, I/O device 140 may be any kind of display device, such as a liquid crystal display (LCD), light emitting diode (LED) display, organic LED (OLED) display, or the like. Further, the display device may be a traditional display or a semi-opaque display, such as a heads up display or the like. Further, the display may be part of a head-mounted display, according to one or more embodiments. Although electronic device 100 is depicted as comprising the numerous components described above, in one or more embodiments, the various components are distributed across multiple devices as part of a distributed system. Further, additional components may be used and some of the functionality of any of the components may be combined.

Figure 2:
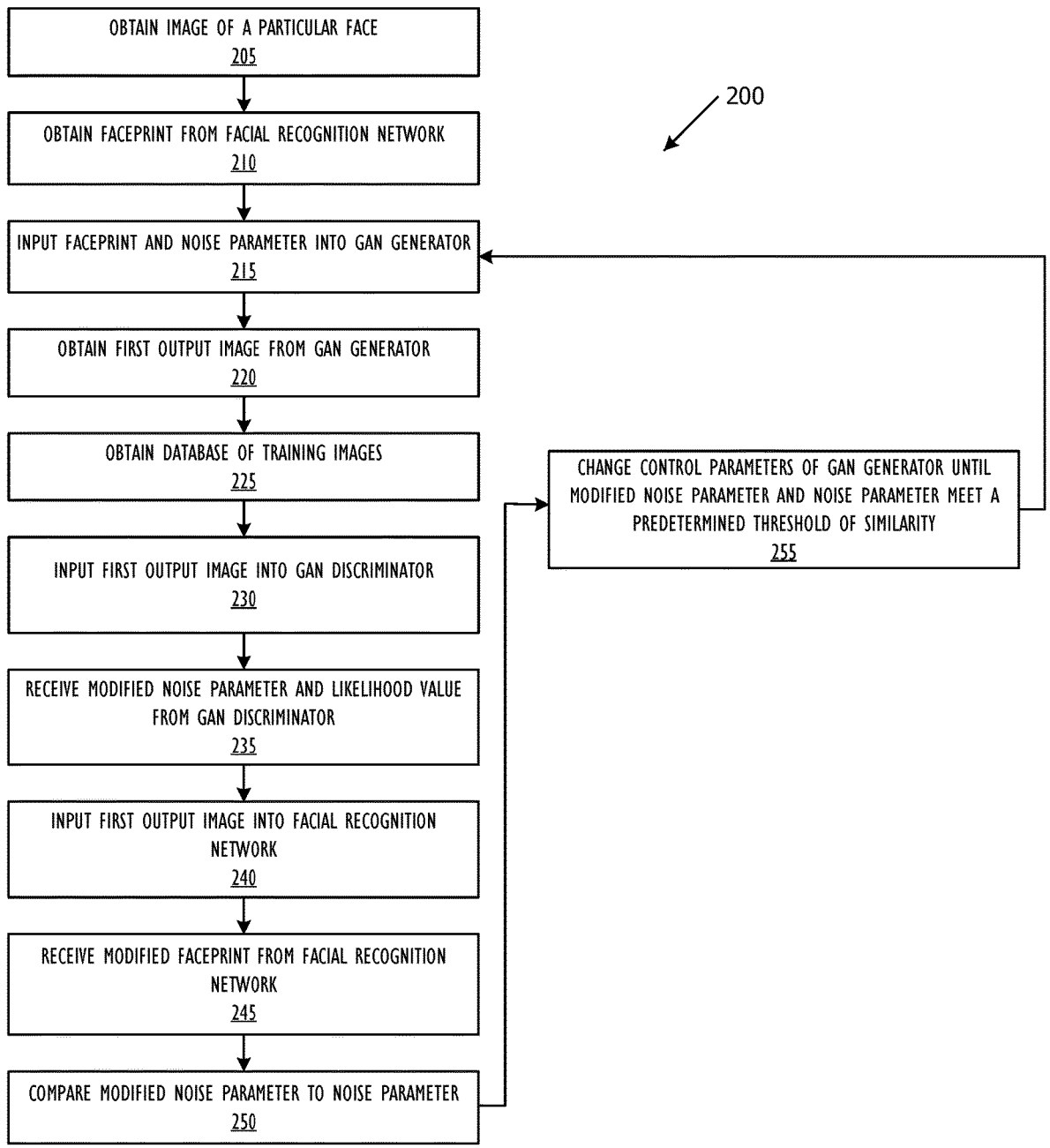
FIG. 2 shows, in flow chart form, an example method for generating facial images using a GAN, according to one or more embodiments.

FIG. 2 shows, in flow chart form, a facial image generation operation 200 using a GAN according to one or more embodiments. Facial image generation operation 200 trains a GAN for use in creation of facial images to be used in training a facial recognition system. For purposes of explanation, the following steps will be described in the context of FIG. 1. Facial image generation operation 200 begins, in some embodiments, at block 205, where facial image generation module 180 obtains an image of a particular face. Facial image generation module 180 may obtain the image of the particular face in any number of ways, including from camera 120, from another electronic device, and the like. In some embodiments, camera 120 captures an image of the particular face, which is stored in memory 150 and retrieved from memory 150 by processor 110 for use by facial image generation module 180.

Facial image generation operation 200 continues at block 210, where facial image generation module 180 obtains a faceprint for the image of the particular face from a facial recognition network, such as facial recognition network module 160. For example, facial image generation module 180 may input the image of the particular face into facial recognition network module 160, which may convert the image into a faceprint. Facial image generation module 180 then obtains the faceprint for the image of the particular face from facial recognition network module 160. The faceprint may be a vector or other identifier that uniquely represents the particular face.

At block 215, facial image generation module 180 inputs the faceprint and a noise parameter into a GAN generator such as GAN generator 172 included in GAN module 170. In one embodiment, the noise parameter may be a vector comprising values selected from a uniform noise distribution. In another embodiment, the noise parameter may be a vector comprising a values selected from a normal noise distribution. GAN generator 172 uses the noise parameter and the faceprint to generate a first output image.

Facial image generation operation 200 continues at block 220, where facial image generation module 180 obtains the first output image from GAN generator 172. At block 225, facial image generation module 180 obtains access to a database of training images for GAN discriminator 174 to use. In some embodiments, the database of training images is a database of captured images of faces of one or more people identified as images of faces by an already trained facial recognition system. The database of training images may be stored in memory 150, or obtained from another electronic device.

Facial image generation operation 200 continues at block 230, where facial image generation module 180 inputs the first output image generated by GAN generator 172 into a GAN discriminator such as GAN discriminator 174 included in GAN module 170. GAN discriminator 174 uses the database of training images to identify features associated with captured images of faces and compare the first output image to the database of training images. GAN discriminator 174 determines the first output image's similarity to the training images and predicts a likelihood the first output image is a captured image including a face, instead of a generated image or an image not including a face. At block 235, facial image generation module 180 receives a modified noise parameter extracted from the first output image and a likelihood value indicative of whether the first output image comprises a captured facial image from GAN discriminator 174. At block 240, facial image generation module 180 inputs the first output image generated by GAN generator 172 into facial recognition network module 160 and receives a modified faceprint from facial recognition network module 160 at block 245.

At block 250, facial image generation module 180 compares the modified noise parameter received from GAN discriminator 174 and the noise parameter input into GAN generator 172. If the modified noise parameter received from GAN discriminator 174 and the noise parameter input to GAN generator 172 do not meet a predetermined threshold of similarity, facial image generation module 180 changes one or more control parameters of GAN generator 172 at block 255. It should be noted, the specific "threshold" used will be based on the needs of each particular application. In some embodiments, changing one or more control parameters of GAN generator 172 may further be based on a comparison of the modified faceprint corresponding to the first output image generated by GAN generator 172 to the faceprint corresponding to the image of the particular face. Once the control parameters of GAN generator 172 have been changed, facial image generation operation 200 returns to block 215, and repeats blocks 215-255 until the modified noise parameter received from GAN discriminator 174 and the noise parameter input to GAN generator 172 meet the predetermined threshold of similarity.

Figure 3:
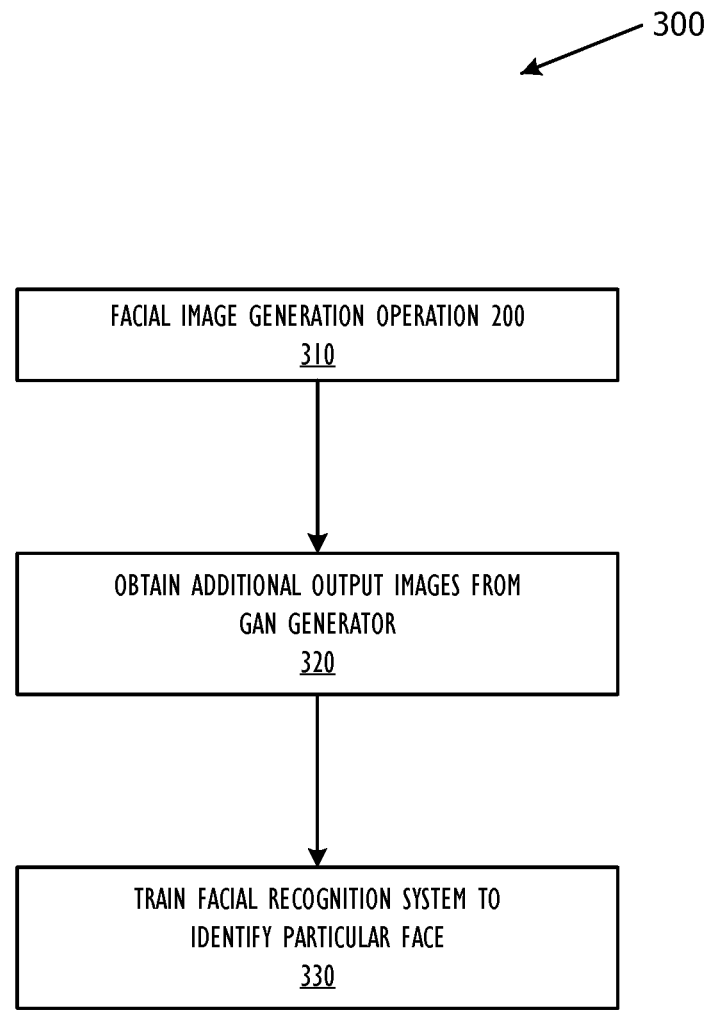
FIG. 3 shows, in flow chart form, a further example method for generating facial images using a GAN according to one or more embodiments.

FIG. 3 shows, in flow chart form, another facial image generation operation 300 including training a facial recognition network using facial images generated by facial image generation operation 200, according to one or more embodiments. For purposes of explanation, the following steps will be described in the context of FIG. 1.

Facial image generation operation 300 begins, in some embodiments, at block 310 when facial image generation module 180 performs the operations discussed previously with reference to FIG. 2 as facial image generation operation 200. Ideally, the first output image generated by GAN generator 172 will be recognizable as the particular face. If not, the modified faceprint received from facial recognition network module 160 will differ from the faceprint by more than a predetermined threshold, prompting adjustment to the control parameters of GAN generator 172.

Ideally, GAN discriminator 174 will not be able to distinguish the first output image generated by GAN generator 172 from the captured images including faces contained in the database of training images. If GAN discriminator 174 recognizes the first output image generated by GAN generator 172 as a generated, rather than a captured, image or determines the first output image generated by GAN generator 172 does not include a face, the first output image generated by GAN generator 172 is not useful in facial identification enrollment and the modified noise parameter received from GAN discriminator 174 and the noise parameter input to GAN generator 172 will not meet a predetermined threshold of similarity, prompting adjustment to the control parameters of GAN generator 172.

When facial image generation operation 200 finishes, the first output image generated by GAN generator 172 is recognizable as the particular face and useful in facial identification enrollment. It should be noted, the specific "threshold" used will be based on the needs of a specific application. Facial image generation operation 300 continues to block 320, where facial image generation module 180 obtains one or more additional output images from GAN generator 172. Note that in some embodiments, GAN generator 172 may be used to generate "negative" output images that do not correspond to the particular face. In this way, "negative" output images may be used to train a facial recognition system which faces are not the particular face. Facial image generation module 180 uses the first output image and the one or more additional output images to train a facial recognition system to identify the particular face at block 330. The facial recognition system may be facial recognition network module 160 or another facial recognition system.

As discussed previously, changing one or more control parameters of GAN generator 172 may further be based on a comparison of the modified faceprint corresponding to the first output image generated by GAN generator 172 and the faceprint corresponding to the image of the particular face. In some embodiments, comparing the modified faceprint and the faceprint determines a first value as follows:

first value=$-\log D_{real}(G(\text{noise}, f)) + \lambda_{ID} \|R(G(\text{noise}, f)) - f\|^2 + \lambda_{DV} \|\text{noise} - D_{noise}(G(\text{noise}, f))\|^2$.

In determining the first value, $-\log D_{real}(G(\text{noise}, f))$ represents an adversarial loss value common to all GANs, $\lambda_{ID}\|R(G(\text{noise}, f))-f\|^2$ represents the minimization of an L2 distance value between the faceprint and the modified faceprint, and $\lambda_{DV}\|\text{noise}-D_{noise}(G(\text{noise}, f))\|^2$ represents a diversity loss value due to the noise parameter. In this equation, f represents the faceprint, noise represents the noise parameter, G (noise, f) represents the first output image, $D_{real}(G(\text{noise}, f))$ represents the probability that the first output image comprises a facial image as determined by GAN discriminator 174, $D_{noise}(G(\text{noise}, f))$ represents the modified noise parameter, $\lambda_{ID}$ represents an identity preservation function from the faceprint to the first output image, and $\lambda_{DV}$ represents a data variation function from the noise parameter to the modified noise parameter. Further, in some embodiments, changing one or more control parameters of GAN generator 172 is based on a second value determined as follows:

second value=$-\log D_{real}(\text{realSamples})+\log D_{real}(G(\text{noise}, f))+\lambda_{DV}\|\text{noise}-D_{noise}(G(\text{noise}, f))\|^2$.

In determining the second value, $-\log D_{real}(\text{realSamples})+\log D_{real}(G(\text{noise}, f))$ represents an adversarial loss value common to all GANs, and $\lambda_{DV}\|\text{noise}-D_{noise}(G(\text{noise}, f))\|^2$ represents a diversity loss value due to the noise parameter. In this equation, $D_{real}(\text{realSamples})$ represents the probability that the database of training images comprises facial images as determined by GAN discriminator 174.

Figure 4:
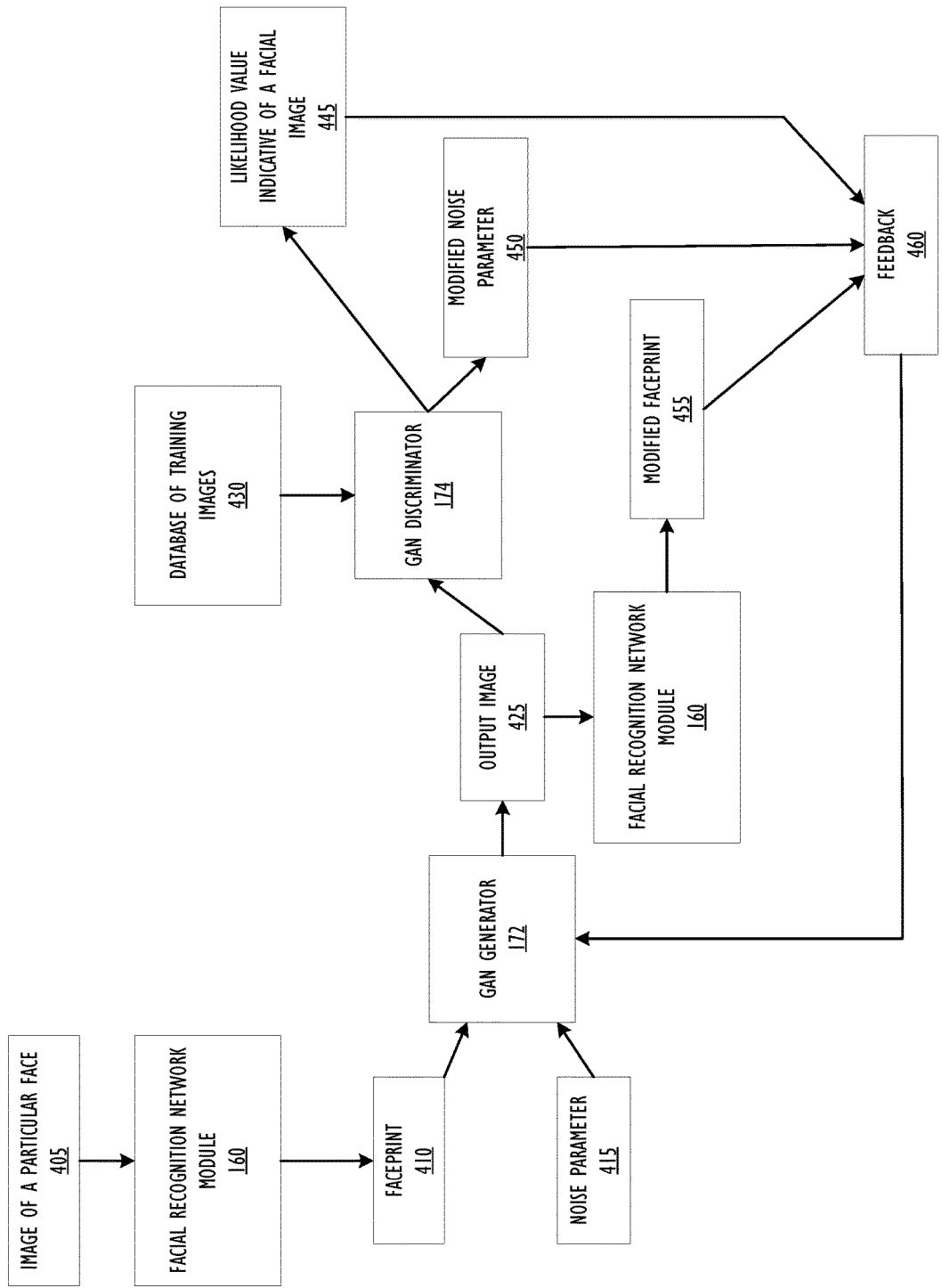
FIG. 4 shows, in flow diagram form, an example setup of the facial recognition network and the GAN generator and discriminator including all inputs and outputs, according to one or more embodiments.

FIG. 4 shows, in flow diagram form, an example setup of facial recognition network module 160, GAN generator 172, and GAN discriminator 174, including all inputs and outputs, according to one or more embodiments. For purposes of explanation, FIG. 4 will be described in the context of FIG. 1. However, it should be understood that the various actions may be performed by alternate components.

An image of a particular face 405 is input into facial recognition network module 160 to obtain faceprint 410. Faceprint 410 and noise parameter 415 are input into GAN generator 172 to obtain output image 425. Output image 425 is input into both facial recognition network module 160 and GAN discriminator 174. Output image 425 is input into facial recognition network module 160 to obtain modified faceprint 455. Output image 425 is input into GAN discriminator 174, which uses a database of training images 430 to obtain a modified noise parameter 450 and a likelihood value indicative of whether output image 425 comprises a facial image 445.

Likelihood value indicative of a facial image 445, modified faceprint 455 and modified noise parameter 450 may be used to provide feedback 460 to GAN generator 172. In one embodiment, feedback 460 may be presented as $\text{Loss}_{Generator}$=adversarial loss+$\lambda_{ID}$(identity loss)+$\lambda_{DV}$(diversity loss) where adversarial loss=$-\log(D_{real}(G(\text{noise}, f))$ and represents an adversarial loss between the GAN generator and discriminator common to all GANs, $\lambda_{ID}$(identity loss)=$\|R(G(\text{noise}, f))-f\|^2$ and represents an identity loss from the faceprint to the modified faceprint, and $\lambda_{DV}$(diversity loss)=$\lambda_{DV}\|\text{noise}-D_{noise}(G(\text{noise}, f))\|^2$ and represents a diversity loss between the noise parameter and the modified noise parameter. In these equations, f represents faceprint 410, noise represents noise parameter 415, G (noise, f) represents output image 425, $D_{real}(G(\text{noise}, f))$ represents the likelihood value indicative of a facial image 445, $D_{noise}(G(\text{noise}, f))$ represents modified noise parameter 450, and R(G (noise, f)) represents modified faceprint 455. Feedback 460 may be used to modify the operating parameters of GAN generator 172.

In some embodiments, GAN generator 172 may provide feedback to GAN discriminator 174 presented as $\text{Loss}_{Discriminator}$=adversarial loss+$\lambda_{DV}$(diversity loss)

where adversarial loss=$-\log D_{real}(\text{realSamples})+\log D_{real}(G(\text{noise}, f))$ and represents an adversarial loss between GAN discriminator 174 and generator 172 common to all GANs, and $D_{real}(\text{realSamples})$ represents the likelihood value GAN discriminator 174 identifies an image from database of training images 430 as including a facial image. The GAN generator 172 and GAN discriminator 174 may iterate back and forth any number of times to optimize the loss equations until the equations stabilize. In one embodiment, optimizing the loss equations may include minimizing the L2 differences between f and R(G(noise, f)) and between noise and $D_{noise}(G(\text{noise}, f))$.

Figure 5:
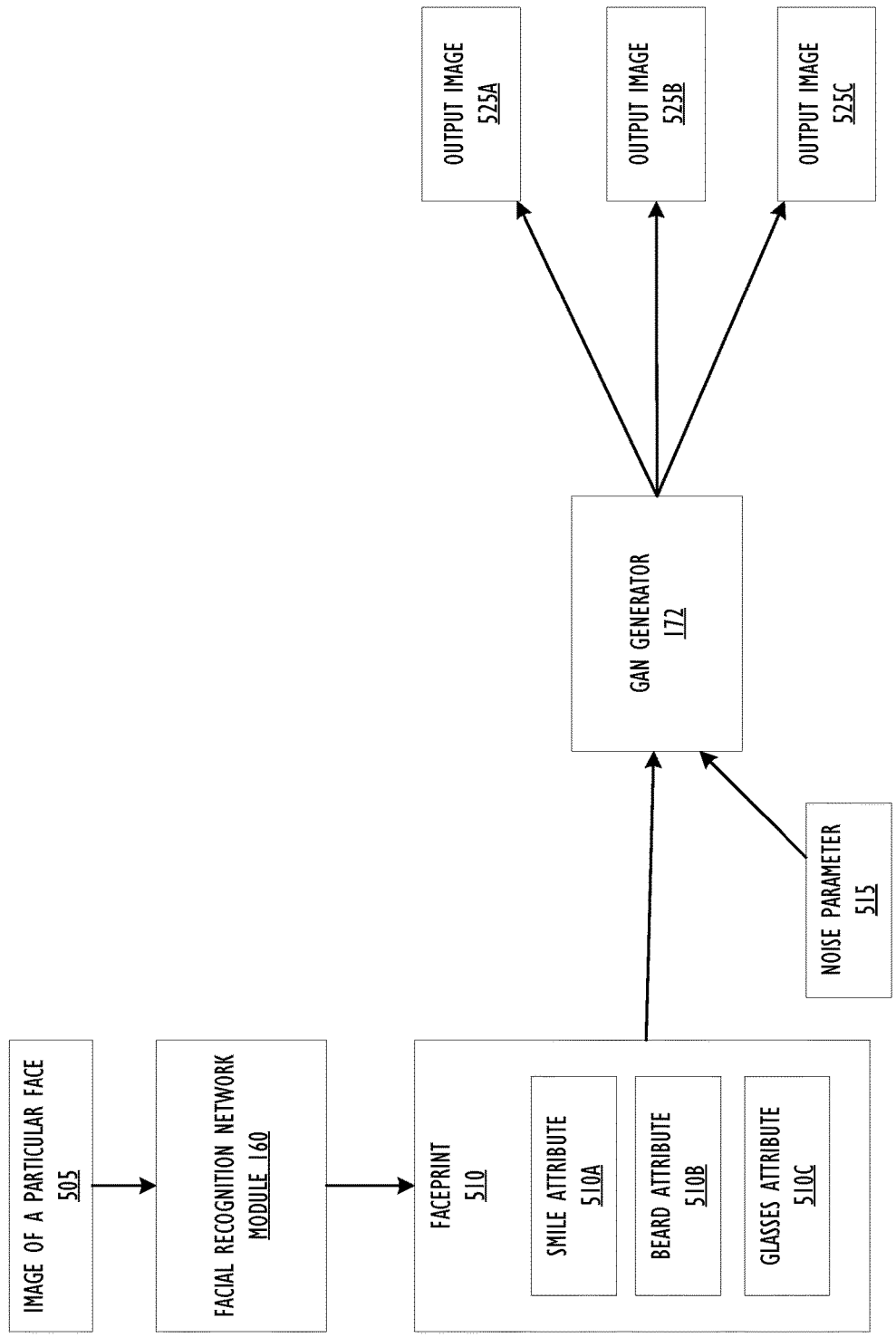
FIG. 5 shows, in flow diagram form, an example set up of the facial recognition network and the GAN generator including all inputs and outputs according to one or more embodiments.

Referring now to FIG. 5, a flow diagram shows an example set up of the facial recognition network 160 and the GAN generator 172 including all inputs and outputs according to one or more embodiments. For purposes of explanation, FIG. 5 will be described in the context of FIG. 1. However, it should be understood that the various actions may be performed by alternate components.

An image of a particular face 505 is input into facial recognition network module 160 to obtain faceprint 510. Faceprint 510 may include specialized attributes, such as smile attribute 510A, beard attribute 5106, and glasses attribute 510C. Faceprint 510 and noise parameter 515 are input into GAN generator 172. Where faceprint 510 includes specialized attributes, GAN generator 172 may target noise parameter 515 on those specialized attributes such that the output image is largely the same as the image of a particular face 505 except for one or more of the attributes. For example, output image 525A may appear the same as image of a particular face 505 except smiling or not smiling, output image 525B may appear the same as image of a particular face 505 except without a beard or with a different style of beard, and output image 525C may appear the same as image of a particular face 505 except without glasses or with a different style of glasses. Thus the modifications to faceprint 510 may be targeted such that a facial recognition network may be trained to recognize the particular person using images with strategic changes from the image of a particular face 505.

Figure 6:
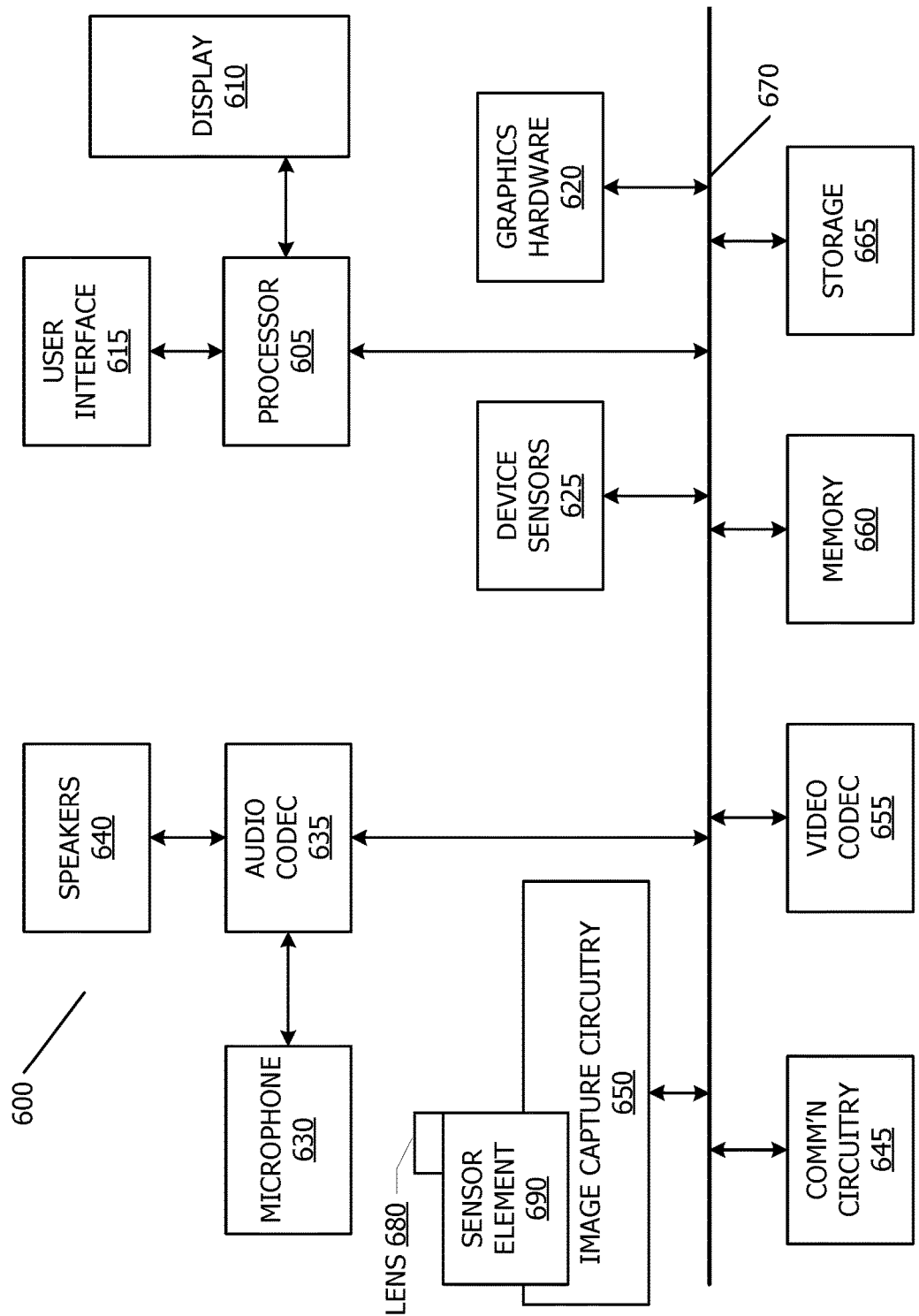
FIG. 6 shows, in block diagram form, a simplified multifunctional electronic device according to one or more embodiments.

Referring now to FIG. 6, a simplified functional block diagram of illustrative multifunction device 600 is shown according to one embodiment. Multifunction device 600 can be used to implement electronic device 100 and may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650, video codec(s) 655 (e.g., in support of digital image capture unit 650), memory 660, storage (device) 665, and communications bus 670. Multifunction device 600 may be, for example, a personal electronic device such as a personal digital assistant (PDA), mobile telephone, or a tablet computer.

User interface 615 may allow a user to interact with multifunction device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Graphics hardware 620 may be special purpose computational hardware for processing graphics and/or assisting processor 605 to process graphics information. In one embodiment, graphics hardware 620 may include a programmable GPU.

Image capture circuitry 650 may include lens assembly 680. Lens assembly 680 may have an associated sensor element 690. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within image capture circuitry 650. Images so captured may be stored in memory 660 and/or storage 665. Image capture circuitry 650 may capture still and video images that may be processed in accordance with this disclosure, at least in part, by video codec(s) 655 and/or processor 605 and/or graphics hardware 620, and/or a dedicated image processing unit incorporated within image capture circuitry 650. Images so captured may be stored in memory 660 and/or storage 665. Microphone 630 may capture audio recordings that may be processed, at least in part, by audio codec(s) 635 and/or processor 605. Audio recordings so captured may be stored in memory 660 and/or storage 665.

As described above, one aspect of the present technology is the gathering and use of data available from various sources to improve facial recognition systems. The present disclosure contemplates that in some instances, this gathered data may include personal information data that uniquely identifies or can be used to contact or locate a specific person. Such personal information data can include demographic data, location-based data, date of birth, or any other identifying or personal information.

The present disclosure recognizes that the use of such personal information data, in the present technology, can be used to the benefit of users. For example, the personal information data can be used to improve facial recognition systems. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of facial recognition services, the present technology can be configured to allow users to select to "opt in" or "opt out" of participation in the collection of personal information data during registration for services or anytime thereafter. Users can select not to provide image data for training of the facial recognition system. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method of training a facial recognition system, comprising:
provinding an input image of a particular face into a first facial recognition system;
obtaining, from the first facial recognition system, an input faceprint;
obtaining, based on the input faceprint and a noise value, a first set of output images and a second set of output images from a pre-trained generative adversarial network (GAN) generator, wherein the pre-trained GAN generator generates the first set of output images recognizable as images of the particular face and the second set of output images recognizable as negative images of the particular face, and wherein negative images of the particular face comprise images not recognizable as images of the particular face; and training, based on the first set of output images and the second set of output images, a second facial recognition system to recognize the particular face.

2. The method of claim 1, wherein providing an input image of a particular face into a first facial recognition system further comprises:

capture, by a camera, an input image of the particular face; and receive, from the camera, the input image of the particular face.

3. The method of claim 1, wherein training, based on the first set of output images and the second set of output images, a second facial recognition system to recognize the particular face further comprises training the second facial recognition system to:

identify the first set of output images as images of the particular face; and identify the second set of output images as images of faces other than the particular face.

4. The method of claim 1, wherein training, based on the first set of output images and the second set of output images, a second facial recognition system to recognize the particular face further comprises:

presenting a notification upon completion of training of the second facial recognition system.

5. The method of claim 1, wherein the second facial recognition system is the first facial recognition system.

6. The method of claim 1, wherein the second facial recognition system is a different facial recognition system than the first facial recognition system.

7. An apparatus for training a facial recognition system, comprising:

one or more processors;

a memory coupled to the one or more processors and comprising instructions executable by the one or more processors to cause the apparatus to:

provide an input image of a particular face into a first facial recognition system;

obtain, from the first facial recognition system, an input faceprint;

obtain, based on the input faceprint and a noise value, a first set of output images and a second set of output images from a pre-trained generative adversarial network (GAN) generator, wherein the pre-trained GAN generator generates the first set of output images recognizable as images of the particular face and the second set of output images recognizable as negative images of the particular face, and wherein negative images of the particular face comprise images not recognizable as images of the particular face; and train, based on the first set of output images and the second set of output images, a second facial recognition system to recognize the particular face.

8. The apparatus of claim 7, wherein the apparatus further comprises a camera.

9. The apparatus of claim 8, wherein the instructions executable by the one or more processors to cause the apparatus to provide an input image of a particular face into a first facial recognition system further comprise instructions executable by the one or more processors to cause the apparatus to:

capture, by the camera, an input image of the particular face; and receive, from the camera, the input image of the particular face.

10. The apparatus of claim 7, wherein the instructions executable by the one or more processors to cause the apparatus to train, based on the first set of output images and the second set of output images, a second facial recognition system to recognize the particular face further comprise instructions executable by the one or more processors to cause the apparatus to train the second facial recognition system to:

identify the first set of output images as images of the particular face; and identify the second set of output images as images of faces other than the particular face.

11. The apparatus of claim 7, wherein the instructions executable by the one or more processors to cause the apparatus to train, based on the first set of output images and the second set of output images, a second facial recognition system to recognize the particular face further comprise instructions executable by the one or more processors to cause the apparatus to:

present a notification upon completion of training of the second facial recognition system.

12. The apparatus of claim 7, wherein the second facial recognition system is the first facial recognition system.

13. The apparatus of claim 7, wherein the second facial recognition system is a different facial recognition system than the first facial recognition system.

14. A non-transitory computer readable medium comprising instructions for training a facial recognition system, wherein the instructions are executable by one or more processors to:

provide an input image of a particular face into a first facial recognition system;

obtain, from the first facial recognition system, an input faceprint;

obtain, based on the input faceprint and a noise value, a first set of output images and a second set of output images from a pre-trained generative adversarial network (GAN) generator, wherein the pre-trained GAN generator generates the first set of output images recognizable as images of the particular face and the second set of output images recognizable as negative images of the particular face, and wherein negative images of the particular face comprise images not recognizable as images of the particular face; and train, based on the first set of output images and the second set of output images, a second facial recognition system to recognize the particular face.

15. The non-transitory computer readable medium of claim 14, wherein the instructions executable by the one or more processors to provide an input image of a particular face into a first facial recognition system further comprise instructions executable by the one or more processors to:

receive, from a camera, a captured input image of the particular face.

16. The non-transitory computer readable medium of claim 14, wherein the instructions executable by the one or more processors to train, based on the first set of output images and the second set of output images, a second facial recognition system to recognize the particular face further comprise instructions executable by the one or more processors to train the second facial recognition system to:

identify the first set of output images as images of the particular face; and identify the second set of output images as images of faces other than the particular face.

17. The non-transitory computer readable medium of claim 14, wherein the instructions executable by the one or more processors to train, based on the first set of output images and the second set of output images, a second facial recognition system to recognize the particular face further comprise instructions executable by the one or more processors to:

present a notification upon completion of training of the second facial recognition system.

18. The non-transitory computer readable medium of claim 14, wherein the second facial recognition system is the first facial recognition system.

19. The non-transitory computer readable medium of claim 14, wherein the second facial recognition system is a different facial recognition system than the first facial recognition system.

20. The non-transitory computer readable medium of claim 14, wherein the GAN is functionally decoupled from a GAN discriminator.

\* \* \* \* \*